July 14, 1925.
J. BOYKOW
1,545,479
APPARATUS FOR STABILIZING BODIES EXPOSED TO EXTERNAL FORCES
Filed June 28, 1921
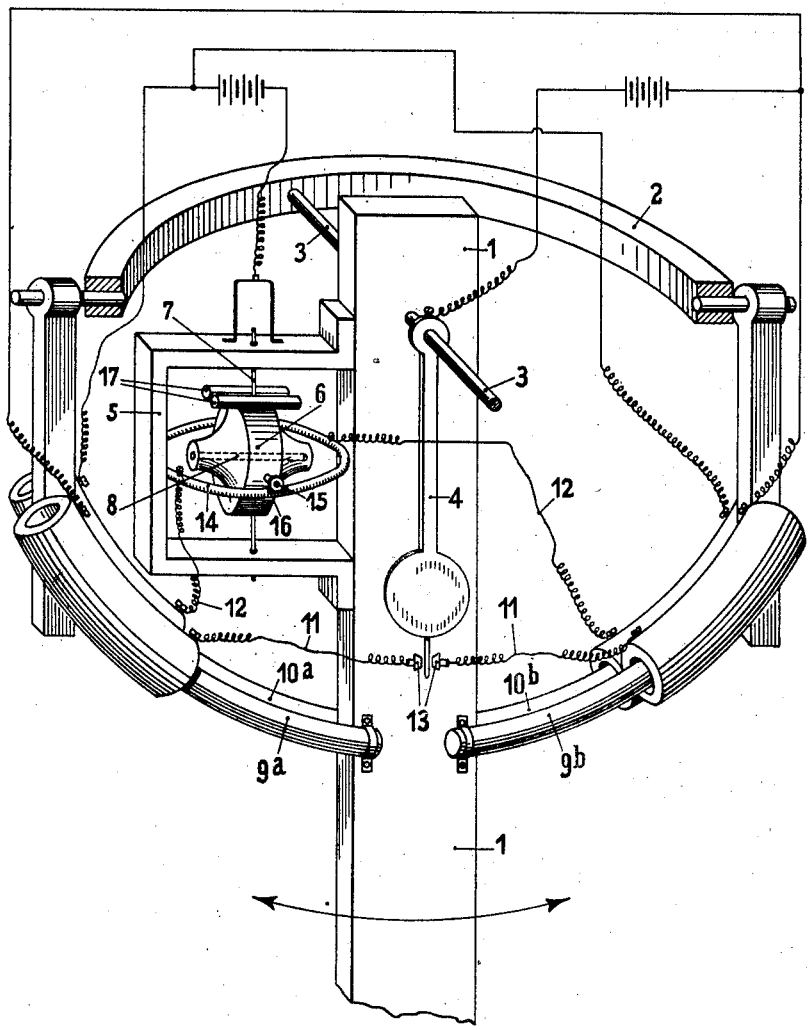
Inventor:
Johann Boykow
by
Leo J. Matty.

Patented July 14, 1925.

1,545,479

UNITED STATES PATENT OFFICE.

JOHANN BOYKOW, OF SCHONEBERG, NEAR BERLIN, GERMANY, ASSIGNOR TO THE FIRM OF IPPCO-GESELLSCHAFT MIT BESCHRÄNKTER HAFTUNG INTERNATIONALE PROJEKTION-PROPAGANDA-COMPAGNIE, OF FRIEDENAU, NEAR BERLIN, GERMANY.

APPARATUS FOR STABILIZING BODIES EXPOSED TO EXTERNAL FORCES.

Application filed June 28, 1921. Serial No. 481,088.

*To all whom it may concern:*

Be it known that I, JOHANN BOYKOW, citizen of the Czechoslovakian Republic, residing at Schoneberg, near Berlin, Germany, have invented certain new and useful Improvements in Apparatus for Stabilizing Bodies Exposed to External Forces (for which I have filed applications in Germany, filed September 10, 1919; Belgium, filed June 19, 1920; Holland, filed June 23, 1920; France, filed July 1, 1920; Italy, filed July 10, 1920; Great Britain, filed July 30, 1920; Switzerland, filed August 4, 1920), of which the following is a specification.

This invention relates to apparatus for stabilizing bodies exposed to external forces.

For certain observation purposes, such as for instance for aerial-geodetic surveying by photography, it is necessary to maintain with the greatest accuracy the vertical reference direction of bodies exposed to outside influences, viz the camera in the said instance. It is true that the vertical direction is given with great accuracy by the central position of a pendulum mounted on the body to be stabilized, but the great deflections which a pendulum experiences, more particularly under ballistic influences, make it impossible to use a pendulum alone as the member controlling the restoring forces which effect the stabilizing of the body.

According to the present invention, this object is attained by combining with the pendulum, which forms the member for controlling the stabilizing forces, a gyroscope, these two members being arranged to co-operate in a particular manner with the result that the angular speed of the body to be stabilized is so strongly reduced by two force exerting devices controlled by the pendulum and by the gyroscope, that the oscillations which the body can make within the period of the pendulum can be reduced as desired, so that, for practical purposes, the body remains permanently in the central position determined by the oscillating pendulum, and which position corresponds to the vertical.

In carrying out the invention there is mounted on the body to be stabilized, a gyroscope having only one degree of freedom besides the freedom to rotate about the axis of its heavy body, in such a manner that the axis of its movement allowed by the degree of freedom, and the axis of the gyroscope itself, when in their middle position, lie in the plane of oscillation of the pendulum or in a plane parallel thereto.

With such a gyroscope arrangement, each turning or twisting of the body about the axis of the pendulum results in displacement of the axis of the gyroscope. It is therefore possible to counteract the turning or twisting by means of a system of restoring forces controlled by the gyroscope and the pendulum, by which the said system tends to bring the position of the body in which the pendulum is supported into consonance with the pendulum position, being subjected to such a limitation that the body to be stabilized is allowed to make, under the action of the pendulum force system, a deflection which can be made as small as possible, before the direction of force of the latter system is reversed in the course of the pendulum oscillation. Of course the force system controlled by the gyroscope must be stronger than the force system controlled by the pendulum, because swinging movements of the pendulum would be able to produce by the pendulum force system similar swinging movements of the body to be stabilized in spite of the force system of the gyroscope. This would trouble the tranquillity of the body to be stabilized. A gyroscope with limited degrees of freedom as here in question is always under the influence of a directional force due to the rotation of the earth. This directional force if it were allowed to take its course would result in time in a deflection of the body to be stabilized from the vertical reference direction in spite of the action of the pendulum, the force system of the same being not strong enough to counteract the gyroscope force system for reasons explained above. In order to avoid this even when using the device for long periods of time, it is necessary to compensate in a suitable manner the influence of the rotation of the earth on the gyroscope system. This can be done in various ways. It is possible to obtain compensation of the influence of the directional force of the rotation of the earth by bearing friction about the axis corresponding to the degree of freedom of the gyroscope. This would necessitate working with a degree of sensitiveness sufficiently low that the variations due to the angular velocity of the earth on its axis would be comparatively negligible. This would not be sufficient for many purposes, more particularly for the chief object under consideration of aerial geodetic photography. For ensuring a greater sensitiveness of the system, it is therefore necessary to utilize other means for compensating the directional force due to the rotation of the earth. A suitable means is for instance the use of a magnetic compensation field. In this way the gyroscope can be made so sensitive that it would respond even in the case of deflection speeds amounting to about 2-3 arc seconds and less, and in that way would satisfy the high requirements of surveying even for aerial geodetic photography.

In order that the invention may be understood a device according thereto is illustrated by way of example and in a diagrammatic manner, in the accompanying drawing, and will now be described.

The body 1 to be stabilized is suspended in a Cardan ring 2 by means of its spindle 3. About the spindle 3 swings also the pendulum 4. In a frame 5 rigidly secured to the body 1 to be stabilized, is mounted the control gyroscope 6. The spindle or axis of the one degree of freedom of the gyroscope in the frame 5, is denoted by 7. The spindle of the gyroscope itself is denoted by 8. The spindle 7 and the gyroscope spindle 8 when in their central position, are in the plane of oscillation of the pendulum 4 or in a plane parallel to it. The pendulum and the gyroscope control each a system of forces acting on the body 1. As shown in the drawing, the forces are derived from solenoids the cores $9^a$, $9^b$ and $10^a$, $10^b$ being secured to the body 1. In the circuits whereby the pendulum energizes the solenoid coils which latter are secured to the support of the body 1, 11 denotes the pendulum, and 12 the gyroscope connections. In the circuit 11 are arranged two contacts 13 operated by the pendulum, whilst in the circuit 12 of the gyroscope is arranged a contact ring 14 and a contact roller 15 sliding on the contact ring 14 and mounted on the gyroscope casing. 16 is a gap in the contact ring 14. Magnets 17 connected to the gyroscope casing, create the field for compensating the directional force of the gyroscope.

The magnets 17 underlie the directing force of the magnetism of the earth and therefore have the tendency to direct their north end to north. On the other hand the gyroscope has the tendency to keep the direction of its axis of rotation 8 invariably within the space. This means that it underlies a directional force derived from the rotation of the earth which causes a precession of the axis of rotation 8 about the axis 7 of the gyroscope casing. If now the north end of the magnet 7 is directed towards the south end of the axis 8 of the gyroscope then the two forces counteract each other and it is possible to give the magnet 17 such power that the deviating effect of the rotation of the earth on the axis of rotation 8 of the gyroscope is exactly compensated by the magnet 17.

When the body to be stabilized is in the prescribed position of rest, the pendulum 4 is exactly between the contacts 13, and the contact roller 15 is over the gap 16 in the contact ring 14. When, owing to a vibration or shock, the pendulum 4 oscillates, it closes a circuit through one of the two contacts 13. The corresponding coil is energized, and accordingly a force acts on the core 9 of the body 1, in the proper direction to bring about an interruption of contact by the pendulum. Without the gyroscope, this action would continue as long as the pendulum and its support swings in one direction, which would result in large oscillations of the body 1 on which the pendulum is mounted.

A deflection of the body 1 in the plane of the pendulum path has however resulted at the same time in a precessional movement of the gyroscope about the axis 7. The roller 15 passes over the contact gap 16 and comes into contact with one or the other half of the contact ring 14, so that the circuit 12 is closed, and the coil situated in the same is energized and acts upon one or the other core 10. The core 10 is acted upon oppositely to the core 9, whereby the body 1 is prevented from assuming an angular speed outside the limits corresponding to the determined sensitiveness of the gyroscope. Under the influence of the gyroscope coil, the body 1 before the reversal of the pendulum movement, can move only along a path which can be kept as small as desired. The oscillations of the body 1 are kept in this way within narrow limits.

Owing to the frictionless support of the spindle 7 and to the compensation of the influence of the directional force due to the rotation of the earth, by the field due to the magnet 17, the sensitiveness of the gyroscope can be raised to an extraordinarily high degree.

The arrangement shown in the drawing effects the stabilizing against oscillations of the body 1 about the axis of the pendulum 4. For stabilizing about an axis at right angles to the same, it is necessary to have another system with a control pendulum and a gyroscope. The two control pendulums could be of course combined into one.

What I claim is:

1. Apparatus for stabilizing against movements in a vertical plane bodies exposed to external forces, for instance photographic cameras for aerial geodetic surveying, comprising two devices for supplying restoring effort to the body to be stabilized in combination with a pendulum and with a gyroscope having besides its freedom of rotation about the axis of its heavy mass one further degree of freedom about an axis situated in the plane parallel to the plane of oscillation of the pendulum at a distance from said plane down to 0, said pendulum and said gyroscope being both mounted on the body to be stabilized and being arranged each to control one of said force devices for supplying restoring effect to the body to be stabilized.

2. Apparatus for stabilizing against movements in a vertical plane bodies exposed to external forces, for instance photographic cameras for aerial geodetic surveying, comprising two devices for supplying restoring effect to the body to be stabilized in combination with a pendulum and with a gyroscope having besides its freedom of rotation about the axis of its heavy mass one further degree of freedom about an axis situated in the plane parallel to the plane of oscillation of the pendulum at a distance from said plane down to 0, said pendulum and said gyroscope being both mounted on the body to be stabilized and being arranged each to control one of said force devices for supplying restoring effect to the body to be stabilized, and means on the gyroscope casing arranged to exert a moment of force on the precessional axis of the gyroscope so as to counteract the directional force due to the rotation of the earth.

In testimony whereof I have signed this specification in the presence of two subscribing witnesses.

JOHANN BOYKOW.

Witnesses:
 HERMANN REISING,
 CHRISTIAN V. HOFE.